United States Patent Office 3,479,042
Patented Nov. 18, 1969

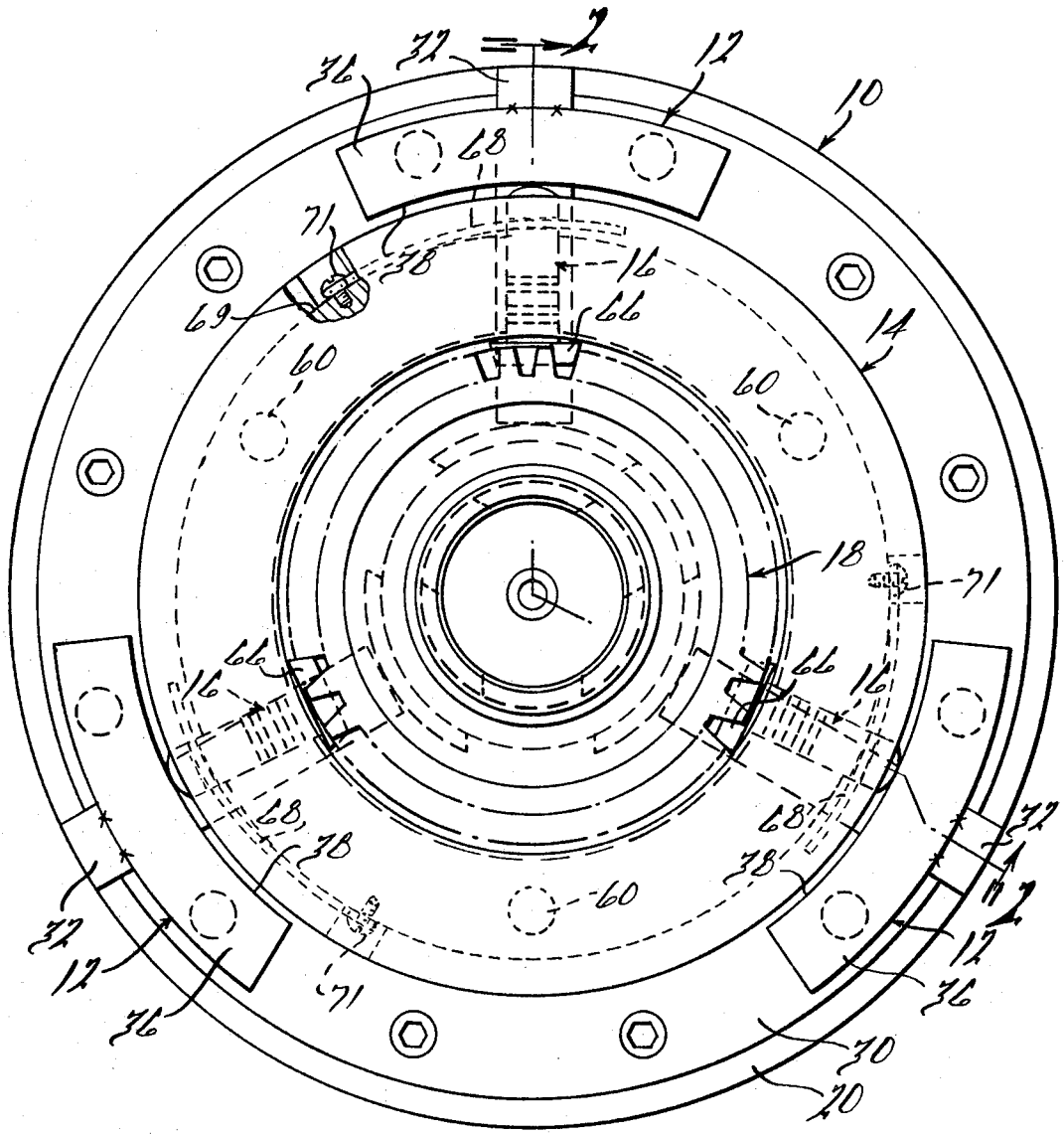

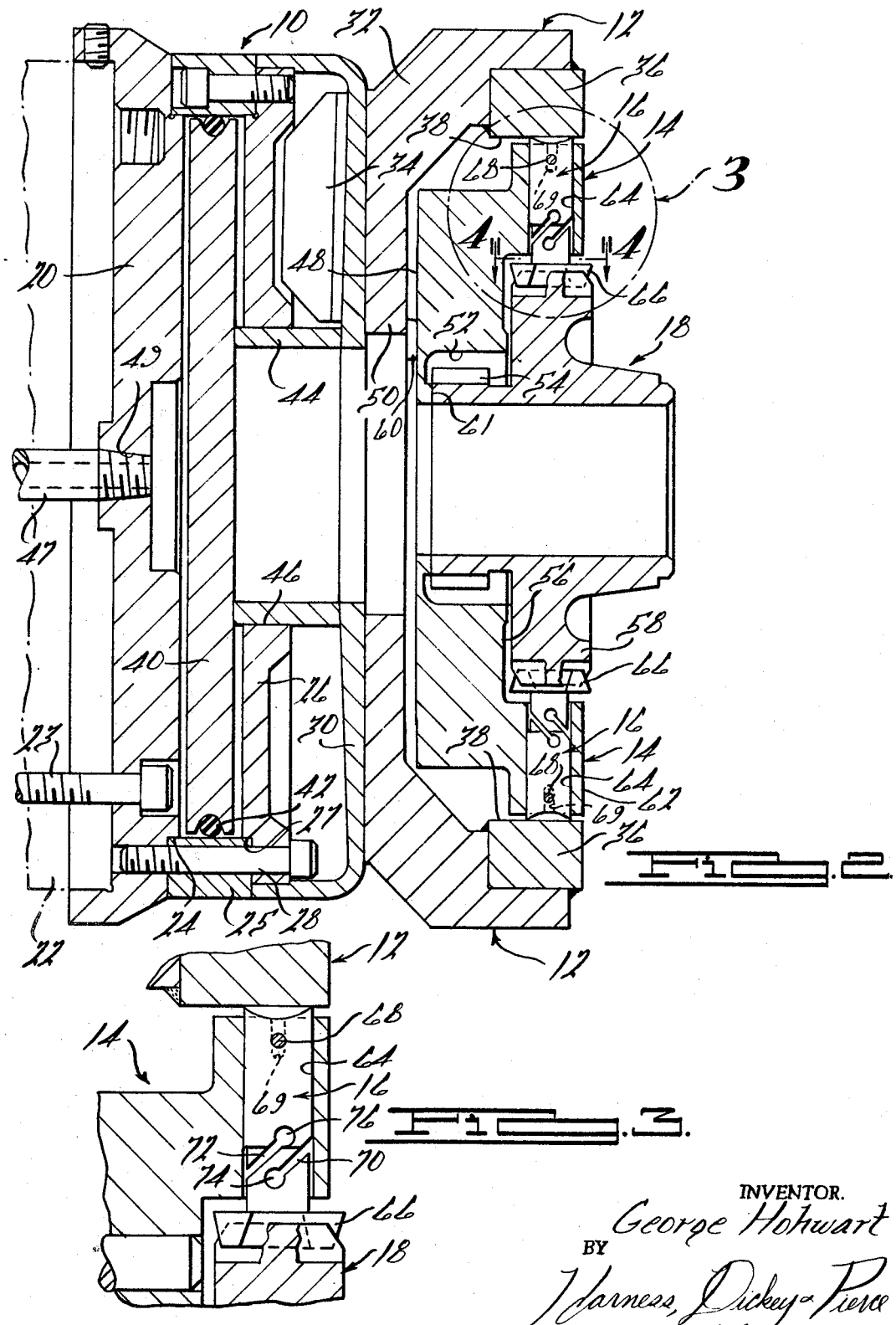

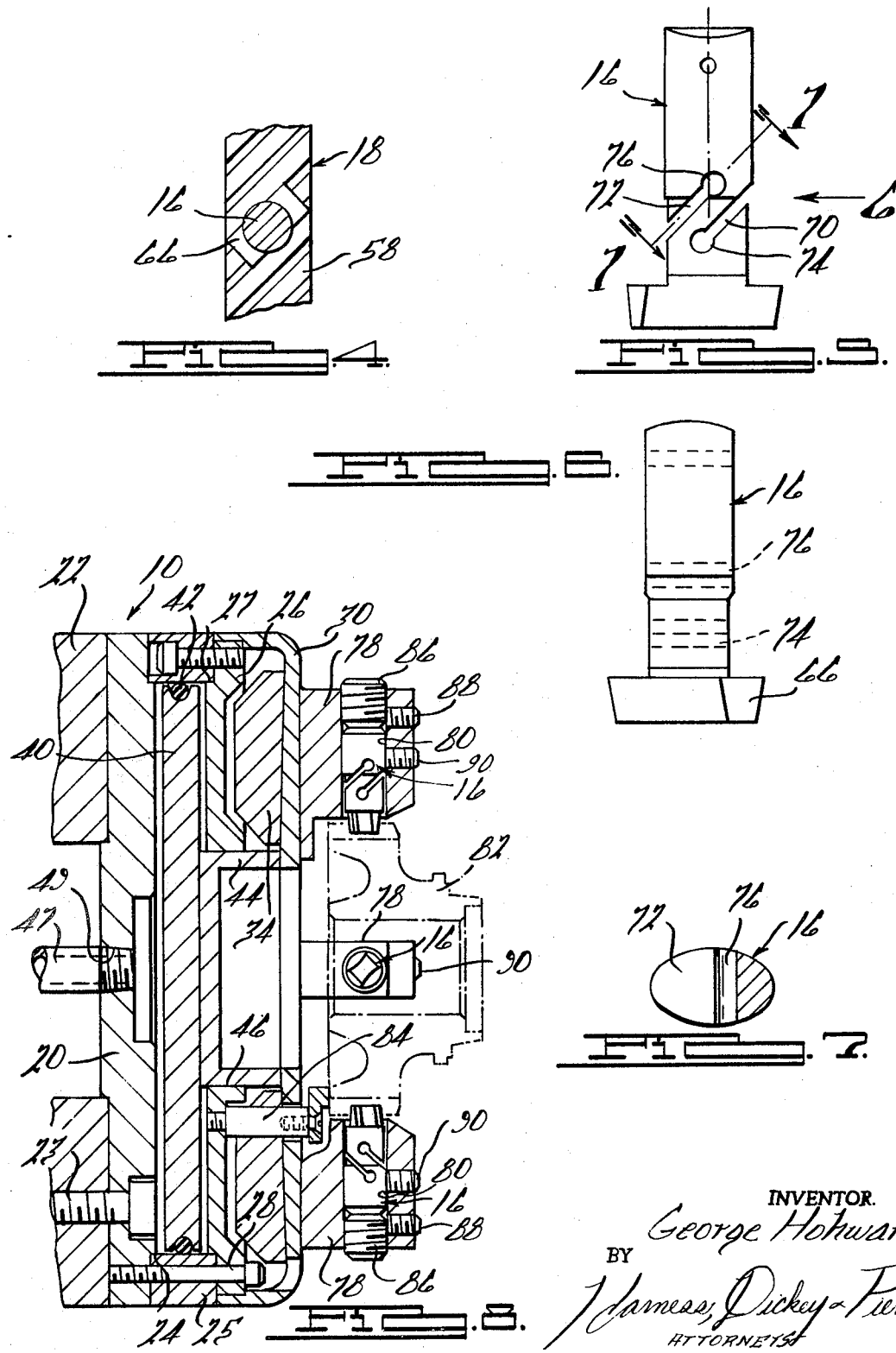

3,479,042
GEAR PIN WITH PULL-BACK ACTION
George Hohwart, Farmington, Mich., assignor to N. A. Woodworth Company, Ferndale, Mich., a corporation of Michigan
Filed Aug. 19, 1966, Ser. No. 573,627
Int. Cl. B23b 5/22
U.S. Cl. 279—123          2 Claims

ABSTRACT OF THE DISCLOSURE

A gear clamping pin for rotatable chucks, the pin having a shank portion and a work engaging portion at one end of the shank, the shank portion being formed intermediate its ends with a pair of longitudinally spaced substantially parallel slots extending diagonally therein from opposite sides thereof and in overlapping relation so that an axially compressive force applied to the pin causes the work engaging end thereof to move laterally with respect to the shank and, when the pin is properly mounted in a chuck, in a direction to pull a gear shaped workpiece engaged thereby back against the end stop of the chuck. Also, an annular gear cage provided with apertures holding and slidably supporting a plurality of radially disposed substantially equi-spaced gear pins of the above type, the pins extending both inwardly and outwardly from the apertures in which they are mounted and clearance being provided between the slotted portions of the pins and the apertures to permit lateral shifting of the work engaging portions of the pins.

BACKGROUND OF THE INVENTION

In gear chucks, it is essential that the workpiece be pulled back during clamping against fixed locating pins on the face of the chuck so that all workpieces are identically positioned axially in the chuck and clamped in each instance with the axis of the work precisely parallel to or coincident with the axis of the chuck. In this manner, length dimensions of the workpieces can be held exactly and radial surfaces of the workpieces can be finished precisely at right angles to the axis of the work. Diaphragm chucks normally provide the necessary pullback action if the workpiece is small in diameter compared to the diameter of the chuck; however, pull-back action is either nonexistent or of little significance and practical effect if the workpiece is large in relation to the size of the chuck or if the workpiece is essentially long so that the clamping pins are disposed relatively far from the diaphragm and therefore move in use essentially parallel to the face of the chuck. Also, diaphragm chucks in which the gear pins are mounted in a gear cage have no pull-back action at all as the pins merely slide in the cage radially of the chuck. Chucks of the sliding jaw type, of course, have no pull-back action either as the jaws and the work clamping pins carried by them move in fixed paths radially on the face of the chuck.

The present invention is a novel gear pin having general utility but adapted particularly for chucks having little or no pull-back action as the pin is uniquely formed to provide pull-back action independently of the construction and operation of the chuck itself. The path followed by the pins as they move from the open position into engagement with the workpiece is immaterial as they deflect automatically as soon as clamping pressure is applied to the work to move the latter back in the chuck solidly against the end locating stops. Thus, the gear pin of this invention provides and assures pull-back action for all types of chucks.

DESCRIPTION OF THE INVENTION

For a detailed description of the invention, reference is now had to the accompanying drawings, wherein:

FIGURE 1 is a face plan view of a diaphragm chuck equipped with a gear cage having work clamping pins embodying the invention;

FIGURE 2 is a longitudinal sectional view taken on the line 2—2 of FIGURE 1;

FIGURE 3 is an enlarged view of the portion of FIGURE 2 enclosed in the circle 3;

FIGURE 4 is a fragmentary, transverse sectional view taken on the line 4—4 of FIGURE 2;

FIGURE 5 is a side elevational view of a gear pin embodying this invention;

FIGURE 6 is a side elevational view of the gear pin shown in FIGURE 5 looking in the direction of the arrow 6;

FIGURE 7 is a transverse sectional view taken on the line 7—7 of FIGURE ; and

FIGURE 8 is a longitudinal sectional view showing the gear pin of this invention mounted directly in the jaw of a diaphragm chuck.

The diaphragm chuck 10 shown in FIGURE 1 is a conventional type having master jaws 12 which accommodate a gear cage 14 equipped with work-engaging and clamping pins 16. A workpiece here shown in the form of a double gear 18 is adapted to be slipped into the gear cage and clampingly engaged by the pins 16. The body of the chuck 10 is adapted for mounting on the spindle of a machine tool which rotatably drives the chuck and a workpiece clamped thereby while a machining or other operation is performed on the work.

More particularly, the chuck 10 here shown is a conventional type having a disk-like mounting plate 20 piloted on the outer end of a machine tool spindle 22 and fastened thereto by screws 23. The outer radial surface of the plate 20 is shouldered as at 24 and piloted concentrically thereon is a ring member 25 which provides a cylinder bore as will be hereinafter more fully appreciated. A backing plate 26 is provided with a shouldered rear face which is piloted at 27 in the bore of the ring member 25 and is secured thereto by screws 28. As shown, the screws 28 which project rearwardly through the backing plate 26 and the ring member 25 and thread into the mounting plate 20 hold these parts assembled together. The diaphragm 30 is of the centrally apertured cup-shaped type disclosed in U.S. Patent No. 2,403,599, and it is positioned concentrically to the remainder of the chuck with its open side facing rearwardly and piloted over the periphery of the backing plate 26. In practice, the diaphragm 30 may be secured in any suitable manner, but it preferably is welded or brazed thereto as disclosed in U.S. Patent No. 2,492,640.

The diaphragm 30 carries three equally angularly spaced master jaws 12, and each master jaw comprises a jaw block member 32 fixed to the outer face of the diaphragm 30 by any suitable means but preferably by welding or brazing. A counterweight 34 is similarly fastened to the inner face of the diaphragm 30 in alignment longitudinally of the chuck with each jaw block 32 so as to offset the tendency of centrifugal force acting on the jaw 12 to open the chuck during roation. A suitable pad or block 36 is welded to each jaw block member 32, as shown in FIGURE 1, and the inner faces 38 of the jaw pads are ground accurately so as to be spaced precisely equidistantly from the rotational axis of the chuck 10 and spindle 22.

The central portion of the diaphragm 30 is caused to be flexed axially by a piston 40 which is mounted for reciprocation within the ring 25 and between the mounting plate 20 and the backing plate 26. The two plates 20 and 26 preferably are spaced from one another only by an amount slightly in excess of the movement required to flex the central portion of the diaphragm 30 to move the jaws 12 from the normally closed position to the open position. In the particular chuck shown, the periphery of the piston 40 is sealed to the bore of the ring 25 by a resilient O-ring 42 received in a peripheral groove in the piston.

Inasmuch as the chuck here shown is adapted to clamp the workpiece 18 externally through the pin holding member or gear cage 14 and gear clamping pins 16, the central portion of the diaphragm 30 is flexed outwardly in order to open the jaws 12 and to release the workpiece 18. To this end, the piston 40 normally is positioned in the rear portion of the cylinder formed by the ring 25, and means is provided between the piston and the central portion of the diaphragm serving to spring the latter axially outwardly upon the application of fluid pressure to the rear face of the piston. In the particular construction shown, such means is in the form of a tubular pusher member 44 which is disposed concentrically to the rotational axis of the chuck with one end butting the forward face of the piston 40 and the other end seating on the inner face of the diaphragm. It will be observed that the pusher ring 44 extends through a central opening 46 in the backing plate 26, and a relatively loose fit is provided between the pusher ring and the backing plate so that the latter retains and guides the pusher member in use while permitting it to slide easily back and forth under power either from the piston 40 or the diaphragm 30.

Fluid under pressure is introduced into the space between the mounting plate 20 and the piston 40 through a tube or pipe 47 extending along the rotational axis of the chuck through a central bore in the spindle 22 and threaded at its forward end into a central opening 49 in the mounting plate 20. The pressure fluid is introduced by any suitable or conventional means into the pipe 47 and this fluid is discharged from the pipe into the cylinder behind the piston 40. This fluid acting on the piston 40 causes the latter to advance in the cylinder and, as it does so, it pushes against the central portion of the diaphragm 30 through the member 44. As the central portion of the diaphragm 30 flexes outwardly in the manner described, it tilts the jaws 12 outwardly and rearwardly. This movement of the jaws 12, while small, is sufficient to release the pressure normally exerted thereby on the work clamping pin 16 so that a workpiece such as the one here shown at 18 can be easily inserted into or removed from the chuck. Contrariwise, upon release of the fluid under pressure in the pipe 47, the force built up in the diaphragm 30 in springing it as above described, is sufficient to return the member 44 and the piston 40 to their normal retracted positions and to effect a radially inward movement of the jaws 12 which causes them to push on the pins 16 so as to force the latter into clamping engagement with the workpiece 18 in the chuck.

The gear cage 14 is generally annular in form, and it fits centrally within the three jaws 12 with the bottom 48 thereof resting on suitable stops 60 preferably carried by and extending forwardly of the backing plate 26 according to conventional practice. In order to adapt the gear cage 14 to the particular double gear form of workpiece here shown by way of illustration, the cage is formed with an inner central recess 52 which accommodates the relatively small portion 54 of the workpiece and a large outer recess 56 which accommodates the relatively large gear portion 58 of the workpiece. An annular rib 61 provided centrally at the bottom of the recess 52 seats the small gear portion 54 to locate and position the workpiece axially in the chuck. A radially outwardly extending annular flange 62 on the gear cage 14 provides additional support for the gear pins 16 the outer shank portions of which fit snugly but adjustably in radial bores or openings 64.

As shown, the gear pins 16 project into the large outer recess 56 of the gear cage 14 and work engaging portions, here shown in the form of chisel shaped or rack-tooth head portions 66, on the inner ends of the pins fit between adjacent teeth of the outer gear portion 58. Furthermore, while clearance is provided between the gear cage 14 and the jaw pads 36, the outer ends of the gear pins 16 bear on the jaw pads so that the latter hold the head portions 66 thereof against the flanks of the gear teeth engaged thereby. As perhaps best shown in FIGURE 1, the chuck 10 has three equispaced jaws 12 and the gear cage 14 accordingly is provided with three equispaced gear pins 16.

When the central portion of the diaphragm is flexed outwardly to open the chuck, the jaws 12 release pressure on the gear pins 16 sufficiently so that the workpiece 18 can be easily inserted into or removed from the gear cage. Conversely, when pressure on the diaphragm 30 is released and the latter springs back in the manner hereinabove described, the jaw pads 36 move into pressed engagement with the gear pins 16 to hold the latter solidly against the workpiece 18 and the latter immovably in the chuck 10. Wires 68 set in slots 69 provided in the circumference of the cage 14 and fastened at one end by screws 71 or the like extend through transverse holes in the gear pins 16 and hold the rack-tooth inner head portions 66 of the gear pins positioned properly in interfitting relation with the gear teeth of the workpiece 18, so that the side surfaces of each head portion 66 engages the flanks of the two gear teeth on opposite sides thereof, and at the same time permit the pins to move freely in or out without affecting the clamping pressure of the chuck.

As previously suggested, it is desirable in a chuck of this type that the workpiece 18 be pulled back axially in the direction of the chuck 10 and against the seating or locating surface 60 during clamping and continuously during a machining or other operation on the work. In fact, this action is absolutely necessary if a length dimension or a radial surface is to be held from a previously machined face. However, when gear cages of the type shown at 14 are used in the chuck, the gear pins 16 which clamp the work 18 are held to a radial path of movement and the rocking action of the jaws 12 cannot be utilized to pull the clamped workpiece into the chuck. Hence, lack of pull-back action in this type of chuck has always been a source of trouble.

According to the present invention, pull-back action is accomplished by forming two overlapping diagonal slots 70 and 72 in the shank portion of each pin 16 adjacent to the rack tooth head 66 thereof. The slots 70 and 72 are best formed by drilling two holes 74 and 76 generally diametrically through the shank of the pin and then cutting the slots 70 and 72 from the edge of the shank to the respective holes. As shown, the holes 74 and 76 are drilled in each instance at the far side of the axis of the shank so that the finished slots extend beyond the center and overlap. In this connection, it is desirable that the slots 70 and 72 be oriented in the shank of the pin so that they extend from the front and rear sides thereof and in the direction of the axis of the chuck in which the pin is to be used. Thus, the slot 70 extends angularly radially inwardly and axially toward the head 66 and the slot 72 extends angularly radially inwardly and axially away from the head 66. Manifestly, the wire 68 not only holds the pin 16 in the cage 14 when the workpiece 18 is removed from the latter, but it also holds the pin 16 against the master jaw 12 and the head 66 positioned for proper engagement with the gear teeth of the workpiece and it can also be used to hold the slots 70 and 72 properly oriented with respect to the chuck itself.

Thus, when the gear pins 16 are provided with the slots 70 and 72, the first increment of clamping pressure causes the pins 16 to seat solidly against the workpiece 18 and the final increment of clamping pressure causes the outer ends of the slots 70 and 72 to close down or narrow which in turn causes the inner terminal portions of the pins to shift rearwardly in the direction of the chuck. This movement of the head portions 66 of the pins moves the workpiece back solidly against the seating and locating rib 61. It is perhaps significant to note that this action occurs even though the main outer shank portions of the gear pins are held stationary during the entire operation. Sufficient flexure of the pins 16 to achieve the desired pull-back action is assured by necking or reducing the diameter of the inner portions of the shanks to provide clearance between the shanks and the walls of the openings 64. Preferably, in the particular pin shown the small-diameter or necked down portion of the shank extends from the rack tooth head portion 66 to approximately the ends of the slots 70 and 72 remote from the head portion. Alternatively, of course, clearance for flexure of the gear pins 16 could be achieved by counterboring the inner ends of the holes 64. It will be apparent also that while the gear pins 16 are here shown with rack tooth or chisel-type inner end portions, the pins can be formed with conical ends, semicylindrical ends, ball point ends, double ball point ends, pyramidal ends or any other form of gear pin end conventionally used.

Also, as indicated previously, lack of pull-back action may be a problem in diaphragm chucks which do not use a gear cage and in which the gear pins are mounted directly in the chuck jaws. For example, when the part is large in relation to the size of the chuck or when the part is essentially long and the work clamping jaws and pins are relatively far from the diaphragm, the travel of the pin is practically parallel to the diaphragm and pull-back action, if any, is negligible. Under these circumstances, and perhaps others, it is desirable to use the slotted pin described in connection with the first form of the invention, as shown in FIGURE 8.

The diaphragm chuck shown in FIGURE 8 is similar in all essential respect to the diaphragm chuck first described and similar numbers are used to designate corresponding parts of the two chucks. However, since the chuck of FIGURE 8 is not intended to be used with a gear cage, its diaphragm is equipped with modified jaws 78 having radial bores 80 which accommodate the gear pins 16. In this form of the invention, the workpiece 82 seats directly on fixed posts 84 mounted in the backing plate 26 and the inner terminal ends of the gear pins 16 project from the inner ends of the bores 80 to engage gear teeth on the circumference on the workpiece 82. Backup screws 86 in the outer ends of the bores 80 butt against the pins 16 to limit outward axial movement thereof. Further, the backup screws 86 are adjustable in the bores to position the pins 16 axially for proper engagement with the workpiece 82 and to hold the latter properly centered in the chuck. Set screws 88 hold the backup screws 86 and set screws 90 hold the gear pins 16 in radial position and keep the latter from inadvertently falling out of the jaws 78.

It will be observed that the gear pins 16 here used are identical to the gear pins described in connection with the first form of the invention and they function in the same manner to achieve the same results of providing or augmenting the pull-back action of the chuck during clamping so as to hold the workpiece 82 solidly against the axial locating surfaces 84.

Having thus described the invention, I claim:

1. A gear clamping pin for rotatable chucks and the like having a shank portion and a work-engaging portion at one end of said shank, said shank portion being formed intermediate its ends with a pair of longitudinally spaced substantially parallel slots extending diagonally therein from opposite sides thereof and in overlapping relation with respect to each other, whereby an axially compressive force on said pin causes said work engaging portion to move laterally with respect to said shank portion.

2. The combination as set forth in claim 1 wherein the portion of said shank adjacent to said work-engaging portion is reduced in diameter and both of said slots extend into the reduced portion of said shank.

References Cited

UNITED STATES PATENTS

| | | | |
|---|---|---|---|
| 1,557,958 | 10/1925 | Anderson | 64—15 |
| 2,568,585 | 9/1951 | Hohwart et al. | 279—46 |
| 3,274,799 | 9/1966 | Danner | 64—4 |

ROBERT C. RIORDON, Primary Examiner

U.S. Cl. X.R.

279—1